Sept. 6, 1938.  W. A. NITSCHE  2,129,438
CONVERTIBLE VEHICLE BODY
Filed Sept. 11, 1937    3 Sheets-Sheet 1

Inventor
By Walter A. Nitsche.
Hiram A. Sturges  Attorney

Sept. 6, 1938. W. A. NITSCHE 2,129,438
CONVERTIBLE VEHICLE BODY
Filed Sept. 11, 1937   3 Sheets-Sheet 2
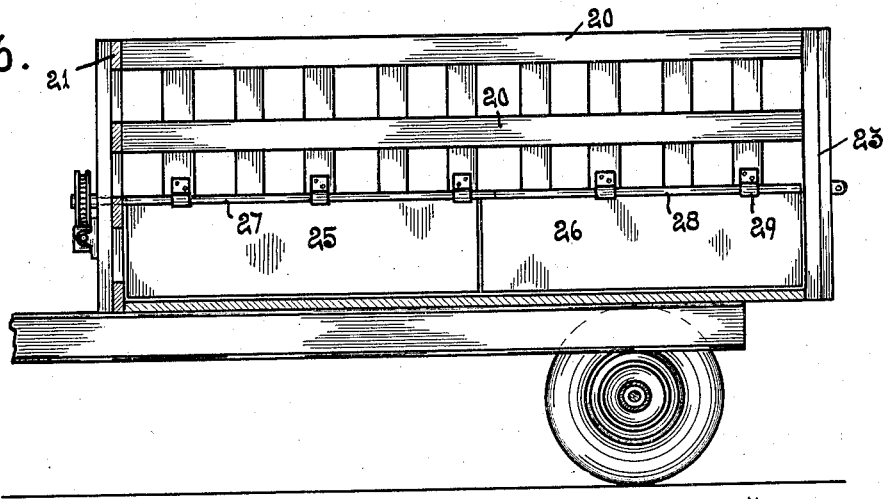
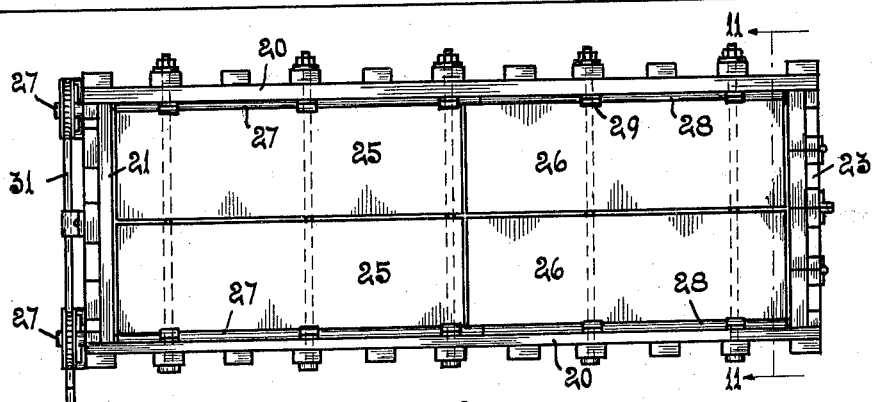
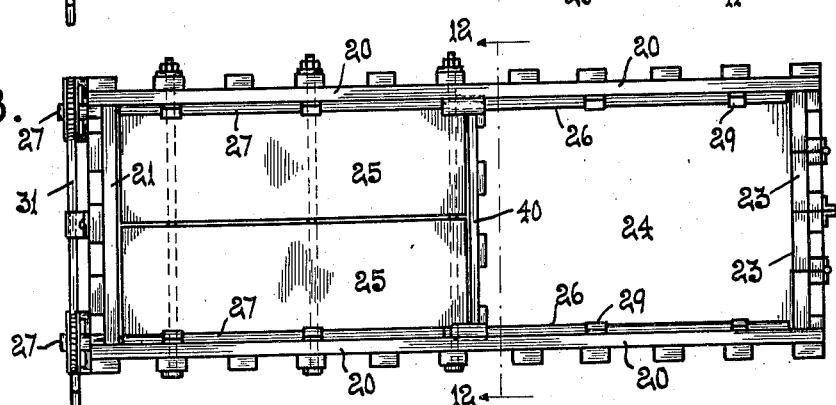
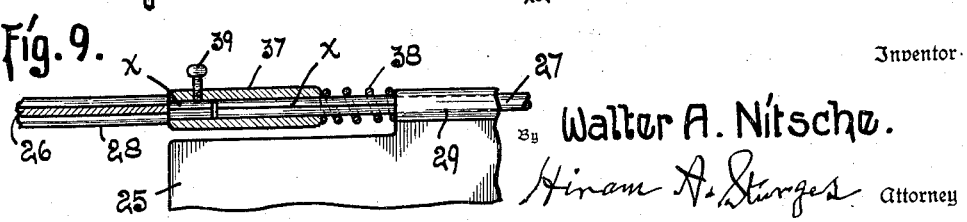
Inventor
Walter A. Nitsche.
By Hiram A. Sturges Attorney Inventor
By Walter A. Nitsche.
Hiram A. Sturges Attorney Patented Sept. 6, 1938

2,129,438

UNITED STATES PATENT OFFICE 2,129,438

CONVERTIBLE VEHICLE BODY

Walter A. Nitsche, South Omaha, Nebr.

Application September 11, 1937, Serial No. 163,406

5 Claims. (Cl. 296—10)

This invention relates to an improvement in trucks, and specifically to an improvement of the body of a truck, and means to form compartments for various uses: 1st, to provide a truck body for containing and hauling cattle to market; 2nd, to arrange the parts for hauling grain; 3d, to provide such an arrangement of parts that a "double deck" will be provided, one floor upon which sheep may stand, and a second floor for hogs or merchandise; and 4th, to provide a compartment for cattle, a compartment for sheep and a compartment for hogs, the change of parts when converting the truck body into the several compartments being convenient for a single operator, and the construction in forming the changes not adding materially to the weight of the truck body.

The invention includes wings mounted on the truck body swingable upon the inner sides thereof from a vertical to horizontal position, and removable cross bars for supporting the wings in horizontal position, and includes a pair of rotatable bifurcated shafts for moving said wings.

Other objects of the invention will appear in the following description of parts.

The invention consists of the new and useful construction, combination and arrangement of parts as described herein and claimed, and as illustrated in the accompanying drawings, it being understood that changes may be made in form, size, proportions and minor details, said changes being within the scope of the invention as claimed.

Figure 1:
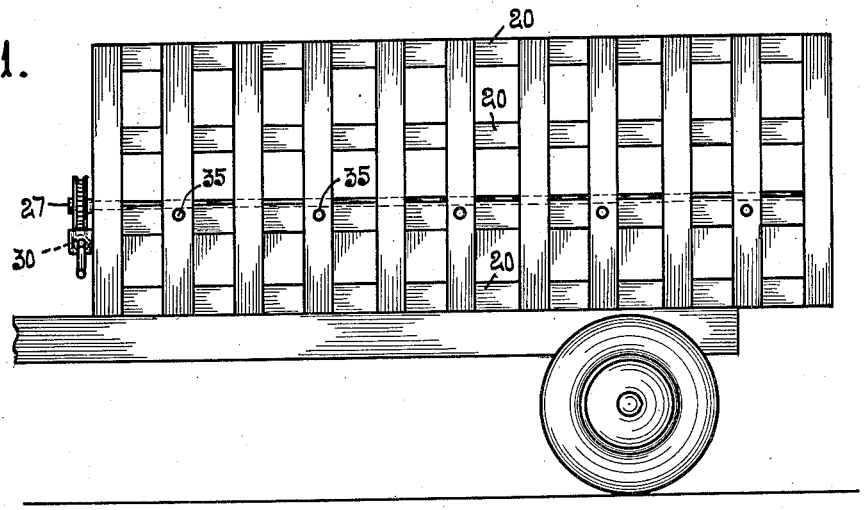
Figure 2:
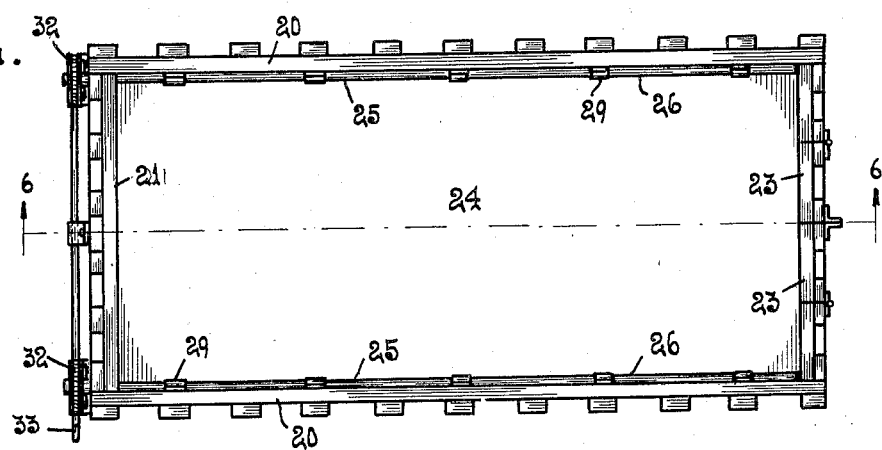

In the drawings, Fig. 1 is a view of the truck body in side elevation, and Fig. 2 is a plan view of the same.

Figure 3:
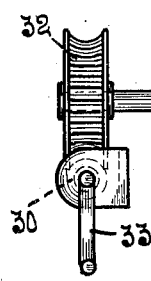
Figure 4:
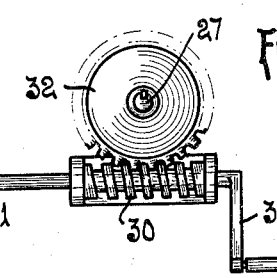
Figure 5:

Fig. 3 is an end view of a worm gear movable for rotating a shaft and Fig. 4 is a side view of the worm gear. Fig. 5 is a view of a supporting-bar.

Fig. 6 is a view of the truck body in longitudinal section on line 6—6 of Fig. 2. Fig. 7 is a plan view of the truck body arranged to form a "double deck". Fig. 8 is a plan view showing the rear part of the truck body arranged for shipping cattle and the front part arranged as a "double deck". Fig. 9 is a detail to show a coupling for a two-part shaft.

Figure 10:
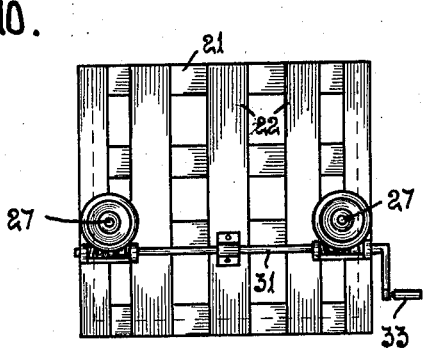
Figure 11:
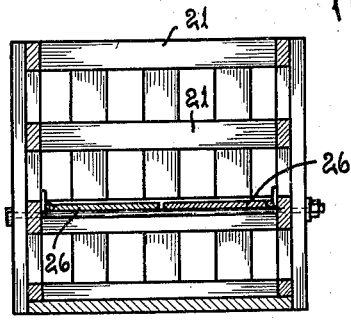

Fig. 10 is a view of the front end of the truck body. Fig. 11 is a transverse section of the truck body on line 11—11 of Fig. 7.

Figure 12:
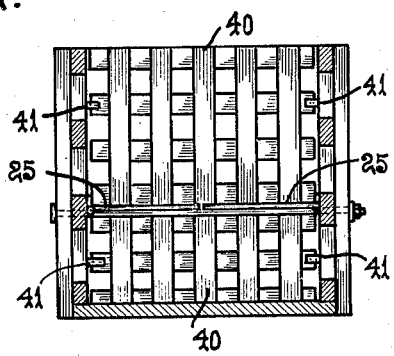
Figure 13:
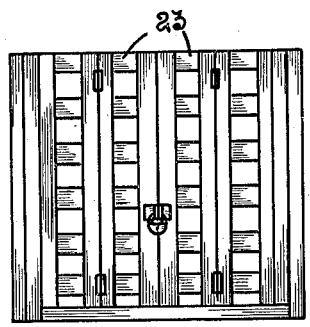
Figure 14:
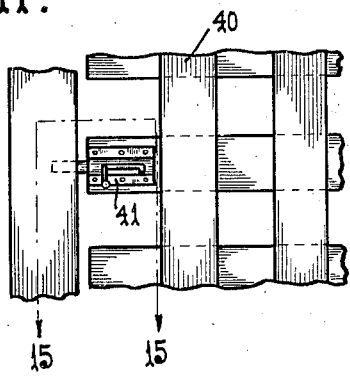
Figure 15:
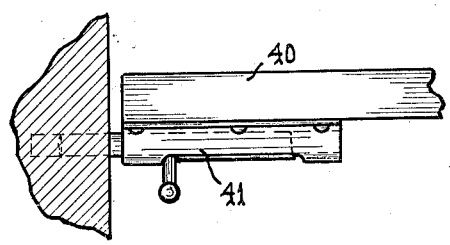
Figure 16:
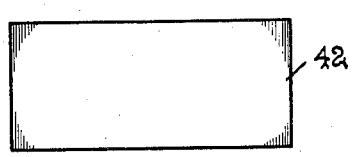

Fig. 12 is a transverse section on line 12—12 of Fig. 8. Fig. 13 is a view of the rear end of the truck body. Fig. 14 is a detail showing coupling for an end gate of one of the compartments of a double deck with the side of the truck body, the parts being shown on an enlarged scale and broken away. Fig. 15 is a sectional view on line 15—15 of Fig. 14, and Fig. 16 is a side view of an end-plate for the truck body when arranged for hauling grain.

Referring now to the drawings for a more particular description, the truck body, rectangular in plan, consists in part of horizontal side strips 20 extending the entire length of said body and suitably spaced apart, the horizontal strips 21 for the front end of said body, the vertical strips 22 suitably spaced apart and disposed upon the outer side of the horizontal strips and suitably secured thereto, and the pair of gates 23 for the rear end floor 24.

While the parts for the sides and ends have been specifically shown and described, it will be understood that any suitable "grill-work" may be employed which will permit free ventilation for cattle and smaller live stock while hauling them to market, the important feature relative to the framework being that it shall be strongly built for resisting stresses, and that all interior parts shall be free from projections so that live stock will not become cut, scratched or injured.

The new features of the invention relate to the advantages in providing compartments for different kinds of live stock.

Convertibility of the truck body for these purposes depends upon the use of swingably mounted wings 25 and 26 arranged in pairs in the truck body, together with their mountings and their control.

Each wing 25 is arranged to swing with a horizontal shaft 27, and each wing 26 swings with a shaft 28. Numerals 29 indicate hinges which are secured to the inner sides of the truck body and also are secured to the wings, the mounting of the hinges being midway between the top and bottom of the truck body.

The wings thus supported will normally be disposed parallel with the sides of the truck body and closely adjacent to the sides of said body, and will occupy only a limited area of the floor space.

The width of each wing is approximately equal to one half the width of the interior of the truck body, and the length of each wing is approximately equal to one half of the length of the interior of said truck body.

Any suitable means may be provided for moving the opposed wings of a pair from their normal vertical position to a horizontal position, the means which I prefer being a pair of worm gears 30 which are mounted on the front end of the truck body, said worm gears being mounted on a horizontal shaft 31, each worm gear being in mesh with a gear wheel 32. The gear wheels 32 are mounted on the shafts 27, and in operation, the two worm gears may be coincidently rotated by use of a crank 33 to cause coincident swinging movements of the wings 25, said worm gears, relatively, being reversely threaded for this purpose.

The wings when swung upwardly 90 degrees from their normal vertical positions will provide a floor for an upper compartment for hogs or sheep, and in order that their weight will be supported a plurality of cross bars or tubes 34 are provided, upon which the wings may rest, apertures 35 being provided in the sides of the truck body for receiving said bars.

In operation, if it is desired to provide the upper compartment mentioned, an operator, by use of the crank 33 causes movements of the shaft 31 and both of the worm gears and the gear wheels 32 and shaft 30, the wings moving to horizontal positions, and the cross bars 34 are then inserted in the apertures 35.

Each supporting-bar 34 is provided at its end with a suitable keeper 36 for maintaining the bar in operative position.

A coupling member is provided for each front shaft 27 for a connection with a rear shaft 26. As shown in Fig. 9, an end-portion $x$ of each of these shafts is of angular form in cross-section and the ends of the shafts are disposed in abutting position. Numeral 37 indicates a sleeve which has an aperture angular in plan, and this sleeve is slidable on these shafts subject to the control of a spring 38.

When it is desired that both of the shafts shall be rotated for moving all of the wings to horizontal position as shown in Fig. 7, the sleeve is disposed in engagement with the angular portions $x$ of the shafts as shown in Fig. 9 of the drawings, when it is desired that the wings 26 shall remain in a vertical position as shown in Fig. 8, the sleeve is moved to the angular part $x$ of the shafts 27 and maintained in that position by a set-screw 39, the result being that the shafts 28 will not rotate, and the wings 26 will remain in a vertical position as shown in Fig. 8.

Numerals 40 indicate a pair of gates for closing the rear ends of the two front compartments (Fig. 12) said gates being provided at their ends with keepers or slide-bolts 41 adapted to engage in the sides of the truck body, said gates or closure members being adapted to be removed or placed in closed position by an operator whenever required.

When it is desired to haul grain to market the wings are disposed in a vertical position and the rectangular plates 42 are placed in the ends of the truck body abutting upon the ends of the wings and the grain will be confined in this box-like structure without leakage.

As thus described, the parts of the truck body may be arranged for the several purposes mentioned and it will be appreciated that the changes may be readily and conveniently made by a single operator.

While the invention has been described as an improvement in truck bodies, the features as described could be used for railway freight cars or other vehicles.

It is obvious that if it is desired, as shown in Fig. 8, to use the two compartments at the front of the truck body and cattle compartment the shafts 27 and 28 must be disconnected as described, but at all other times the sleeves are connected as units by the sleeves 37 as mentioned.

I claim as my invention,—

1. In a rectangular convertible vehicle body, a pair of opposed horizontal shafts within and rotatably mounted on the sides of said body, each shaft being provided with a gear wheel and a rectangular wing, a second pair of opposed shafts within and rotatably mounted on the sides of the vehicle body each being disposed in line with a shaft of the first named pair and provided with a rectangular wing, a pair of clutch-members mounted on the shafts of one pair and slidable at will for coupling the second pair with the first named pair of shafts, mechanism on the vehicle body in engagement with said gear wheels for rotating the first named shafts to permit the wings thereof to move to horizontal position and a plurality of cross-bars on the vehicle body for maintaining said wings in said horizontal position.

2. In a rectangular, convertible vehicle body having upright, foraminous walls, a pair of opposed, rectangular wings mounted swingably at their upper edges to the inner sides midway between the top and bottom of the vehicle body to permit movements of said wings to dispose their lower edges in engagement with said bottom, and a pair of closure-plates adapted to be disposed between the ends of said wings and the foraminous walls of said vehicle body to form a container for granular material.

3. In a rectangular, convertible vehicle body, a closure-plate disposed midway between the ends in the upper part and transversely of the vehicle body, fastening elements on the closure-plate for securing it to the sides of said body, a pair of horizontal shafts in bearings midway between the top and bottom of said body, a pair of wings mounted on the shafts and movable therewith, co-operating means on the shafts and vehicle body for coincidently rotating said shafts for moving said wings in arcs of 90 degrees into engagement with said closure-plate, and cross-bars on the vehicle body for supporting said wings.

4. In a convertible vehicle body, a pair of horizontal shafts within and mounted in bearings on the opposed sides of said body each shaft being provided with a wing, a second pair of shafts within and mounted in bearings on the opposed sides of said body, each second shaft being disposed in line with a first named shaft and provided with a wing, a pair of clutch-members mounted on the shafts of one pair for coupling them with the shafts of the other pair of shafts, co-operating means on the vehicle body and first named pair of shafts adapted to be actuated for rotating the shafts of said first named pair to cause the wings of the second pair of shafts to move to a horizontal position, and means on the vehicle body for supporting said wings in said horizontal position.

5. In a convertible vehicle body, a pair of horizontal shafts having bearings in the vehicle body and provided with a pair of wings, co-operating means on said body in engagement for rotating said shafts for coincidently moving the wings to a horizontal position, a second pair of shafts having bearings in the vehicle body and provided with a pair of wings, and a pair of clutch-members mounted on the shafts of one pair adapted to become coupled with the shafts of the other pair of shafts to cause movements of the wings of the last named shafts coincidently with the movements of the wings of the first named pair of shafts.

WALTER A. NITSCHE.